J. D. ROBERTSON.
VALVE FOR STEAM HEATING SYSTEMS.
APPLICATION FILED FEB. 19, 1918.
1,287,107.
Patented Dec. 10, 1918.
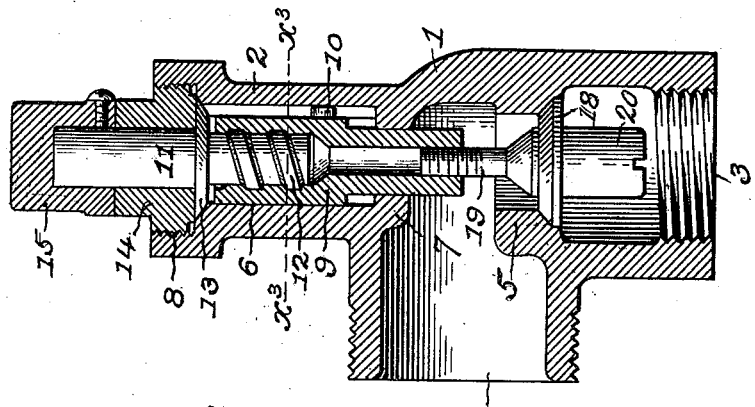
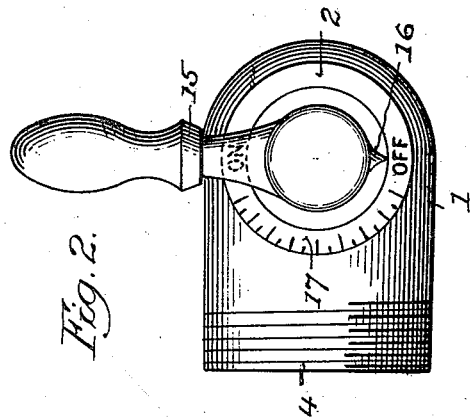
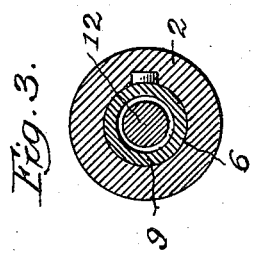
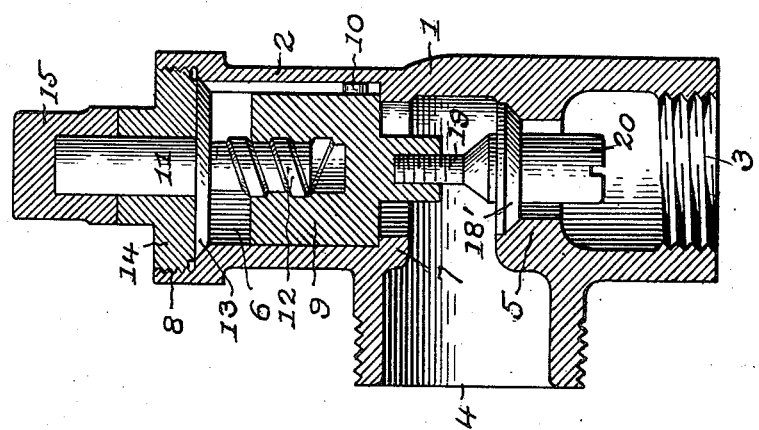
Witness:
John Enders
Inventor:
James D. Robertson,
by Robert Burns,
Atty.

UNITED STATES PATENT OFFICE.

JAMES D. ROBERTSON, OF CHICAGO, ILLINOIS.

VALVE FOR STEAM-HEATING SYSTEMS.

1,287,107.   Specification of Letters Patent.   Patented Dec. 10, 1918.

Application filed February 19, 1918. Serial No. 218,021.

*To all whom it may concern:*

Be it known that I, JAMES D. ROBERTSON, a citizen of the United States of America, and a resident of Chicago, in the county of Cook, State of Illinois, have invented certain new and useful Improvements in Valves for Steam-Heating Systems, of which the following is a specification.

This invention relates more especially to regulating valves for the radiator connections of steam heating systems and more particularly the vapor type of such systems, and the present improvement has for its object:—

To provide a simple and efficient structural formation and association of valve parts, adapted for initial adjustment by the engineer in a manner inaccessible to the user, to a predetermined flow, with such predetermined flow capable of ready and accurate control by said user, all as will hereinafter more fully appear.

In the accompanying drawing:—

Figure 1, is a central sectional elevation illustrating the preferred structural arrangement of the present improvement.

Fig. 2, is a plan view of the valve and operating handle.

Fig. 3, is a horizontal section on line $X^3$—$X^3$, Fig. 1.

Fig. 4, is a central sectional elevation of a modified arrangement of the valve parts.

Like reference numerals indicate like parts in the several views.

Referring to the drawing, 1 designates the main housing of the valve, formed with a holding neck 2 for the operating mechanism of the valve, with induction and eduction necks 3 and 4, and with a partition 5 intermediate of the necks 3 and 4 and formed with a central orifice and valve seat for the movable valve head hereinafter described. In the present structure the holding neck 2 is formed with a guide bore or chamber 6 having at its lower end a stop flange or rim 7, and at its upper end communicates with an enlarged bore or chamber 8 internally screw-threaded as shown.

9 designates a guide plug sliding in the bore or chamber 6 and held from turning movement by a guide pin 10 and groove. In its upper portion said guide plug 9 is formed with an axial orifice formed with a quick-pitch screw thread for operative engagement with a correspondingly threaded end of the operating stem of the valve mechanism hereinafter described. In its lower portion said guide plug 9 is formed with a screw-threaded axial orifice for adjustable engagement with a correspondingly formed stem of the movable valve head of the structure.

11 designates the axially arranged operating stem of the valve, provided with a quick-pitch screw thread on its lower end 12 adapted for operative engagement in the correspondingly formed orifice of the guide plug 9 aforesaid. Intermediate its length, the operating stem 11 is provided with a cone shaped collar 13 adapted for bearing engagement upon a correspondingly formed seat at the bottom of the aforesaid enlarged bore or chamber 8 of the neck 2 of the valve housing, and is held in place in a steam tight manner by a screw-plug 14 screwed into the enlarged bore or chamber 8 as shown.

15 designates an operating handle or crank secured to the upper end of the valve stem 11 aforesaid, and provided with a finger or pointer 16 adapted to indicate the degree of opening of the valve on a fixed scale or grading 17 on the top surface of the integrally formed holding neck 2 of the valve housing.

18 designates the movable valve head above referred to, of the usual cone form and provided with an upper screw-threaded stem 19 for adjustable engagement with the guide plug 9 above described. At its lower end said valve head 18 is provided with a depending stem 20 notched or otherwise formed for convenient operation by an engineer in setting the valve head for a predetermined maximum flow of steam through the valve.

In effecting such predetermined flow adjustment in the preferred structure shown in Fig. 1, in which the valve head 18 closes in the direction of the flow of fluid through the valve, the engineer with the induction neck 3 disconnected from the steam pipe, will first turn the operating handle 15 to bring the guide plug 9 to its lower position abutting against the stop flange or rim 7 aforesaid, after which the engineer will effect an adjustment of the valve head 18 by means of its depending stem 20, to the degree of opening required to provide the desired maximum flow through the valve. With such adjustment effected the valve is again connected with the piping of the system with the described adjusting means wholly inaccessible to the user.

The modified construction shown in Fig. 4, is substantially the same as that described in connection with Fig. 1, except that the valve head 18' closes in a direction opposite to the flow of fluid through the valve, and with the further exception that the valve head 18' and its associated operating means, comprising the guide plug 9 and operating stem 11 are removable as a whole, through the neck 2 of the valve housing for effecting the predetermined adjustment above described in connection with the structure shown in Fig. 1.

Having thus fully described my said invention, what I claim as new and desire to secure by Letters Patent, is:—

1. In a valve of the type described, the combination of a valve housing having a guide neck formed with an upper bore, and with a lower reduced bore communicating with the upper bore and having a stop flange at its lower end, a guide plug having a sliding non-rotative movement in the lower bore of the guide neck aforesaid, a valve head adjustably connected to said guide plug and provided with an adjusting means on its lower end, a rotary stem formed at its mid-length with a cone shaped collar and on its lower portion with a quick-pitch screw thread engaging a correspondingly formed orifice in the guide plug aforesaid, an operating handle on said stem, and a screw plug engaging the upper bore of the guide neck aforesaid and having bearing engagement against the aforesaid cone collar of the stem, substantially as set forth.

2. In a valve of the type described, the combination of a valve housing, having a guide neck formed with an upper bore, and with a lower reduced bore communicating with the upper bore and having a stop flange at its lower end, a guide plug having a sliding non-rotative movement in the lower bore of the guide neck aforesaid, a valve head adjustably connected to said guide plug and provided with an adjusting means on its lower end, a rotary stem formed at its mid-length with a cone shaped collar and on its lower portion with a quick pitch screw thread engaging a correspondingly formed orifice in the guide plug aforesaid, a screw plug engaging the upper bore of the guide neck aforesaid and having bearing engagement against the aforesaid cone collar of the stem, a handle on said stem provided with a pointer, and a scale formed on the guide neck of the housing, substantially as set forth.

Signed at Chicago, Illinois, this 15th day of February, 1918.

JAMES D. ROBERTSON.